INVENTOR.
LAWRENCE R. SPERBERG
BY
MARCUS L. BATES

United States Patent Office 3,725,165
Patented Apr. 3, 1973

3,725,165
METHOD FOR MANUFACTURE OF A MORE UNIFORM PNEUMATIC TIRE
Lawrence R. Sperberg, 6740 Fiesta Drive,
El Paso, Tex. 79912
Filed June 19, 1970, Ser. No. 37,054
Int. Cl. B29h 17/26
U.S. Cl. 156—123                             11 Claims

ABSTRACT OF THE DISCLOSURE

A tire which may be a bias, a belted bias, or belted radially constructed tire. After all the elements have been assembled and the tire is ready for vulcanization, it is preheated to a temperature range of 140° to 230° F. while the individual tire cords are simultaneously subjected to a pulse tension. The green unvulcanized tire is first expanded into a configuration approximating that of the final tire shape then preheated by circulating a heating medium through the shaping or curing bag which serves as a source of heat to warm the tire as well as the means for expanding the tire so that the before mentioned tension is applied to the individual tire cords. The internal pressure of the heating medium may be maintained constant, or may be allowed to pulse through maximum and minimum values in the range of 2% to 10% of the cord tensile strength, thereby altering the tension on the individual tire cords. At the completion of the cord relaxation step the tire is inserted into the curing mold and subjected to the normal cure cycle.

BACKGROUND OF THE INVENTION

In manufacturing a biased constructed tire, the plies of the tire are cut from the ply cord fabric material at a biased angle in order to permit the initial fabrication of the tire upon a drum. The tire builder places the fabric of each ply upon the drum under a constant tension, with great care being exercised to exactly align the various plies with respect to each other. The tread is generally extruded to enable the tire builder to conveniently wrap the unvulcanized tread rubber compound about the assembled plies, with the unvulcanized tread being placed about the plies located upon the drum, with the ends of the tread meeting in abutting relationship.

In manufacturing a bias belted tire, much the same procedure is used as for building bias tires with the belt plies being placed on top the body plies in the center of the building drum. The belt plies are normally cut at a different angle than the cord plies used in the tire body, so that when the tire is expanded and shaped, the angle made by the cords in the belt ply with an imaginary line corresponding to the equatorial plane of the tire are less than the corresponding angles between the body plies and the same equatorial line.

As the angle differential increases between the belt and the body plies, difficulty may be encountered in shaping the tire, and it is often times desirable to at least partially shape or expand the body plies before applying the relatively inexpansible belt plies.

In a belted radial tire, the relatively inexpansible belt requires that the tire be built onto a mold that closely resembles the final configuration of the tire, at least in the upper portion or crown. The exact amount of tread rubber is provided, and if the tire builder uniformly assembles the tire, the resulting structure will be uniform since it is not necessary for the belted tire to be deformed from the configuration of the tire building drum into the configuration of the vulcanization mold, such as must be accomplished with the biased constructed tire.

So called racing tires also enjoy a high degree of uniformity and great care is taken in assembling the various tire elements with respect to each other and to the tire building drum. The major reason that racing tires are more uniform than commercially built tires is because of the lesser amount of tread rubber compound used in the fabrication thereof. A further contributing reason is because the tread rubber that is applied is uniform in thickness across the tire crown. Airplane tires, like high speed racing tires, also have a uniform thickness tread across the tire crown.

Hence, in building any tire, misalignment of the various plies with respect to the remaining elements of the tire produces a non-uniform tire. Likewise, the tread rubber can be misaligned with respect to the remaining elements of the tire as well as not being properly distributed about the tire. Accordingly, the ends of the tread rubber compound are often in an overly stretched or conversely, in a heavy bunched condition rather than a perfectly uniform abutting relationship.

Rubber, before it is vulcanized, has a particular viscosity at room temperature, and as the rubber is heated the viscosity is lowered in proportion to the temperature rise thereof. The vulcanization process occurs at a rate that is related to the temperature of the vulcanization reaction, and at temperatures above 230° F. the vulcanization process begins to achieve an appreciable recognizable state. At temperatures below 230° F., the vulcanization reaction is proceeding so slowly considerable time is required for visual evidence of vulcanization. Different rubber compounds proceed at different reaction rates, therefore the above is a generalization. Hence, it is possible to preheat a tire to a temperature near 230° F. (depending upon the amount of accelerator in the particular rubber compound), then to cool the tire to ambient conditions without appreciable vulcanization having occurred so far as regards later successful vulcanization of the tire.

A visual study of a number of commercially manufactured pneumatic tires reveals that all tires do not have uniform cord distribution within the individual plies of a tire. Proper cord distribution within a ply in this application is meant the intended direction of a single cord from a bead on one side of the tire up the sidewall, across the shoulder, crown, opposite shoulder, and to the opposite bead to thereby describe a particular line of travel which the tire designer intended the cord to assume. A distorted cord in this application refers to a cord which deviates from this intended line of travel and has uneven irregular tension along its length as a consequence of the distortion while a proper cord distribution has a uniform and regular tension or variation thereof along its length.

In a number of tires which exhibited abnormal force variations, applicant has discovered that the cord distribution, or angle, in one or more plies deviated a substantial amount from the normal intended path, particularly in the shoulder and upper buttress area in both bias and belted bias constructed tires. This deviation, or distortion of the cord angle, also sometimes called distortion of the cord planograph, most often occurs in the shoulder of the tire, but in some cases is also noted to continue into the crown of the tire and at times in the sidewall or upper buttress area. This distortion is easy to discover when it is present in the plies adjacent the gas chamber of a tube type tire, however this distortion can occur in one of the remaining plies that are hidden from view and it is therefore impossible to visually observe the hidden defect without first removing one or more plies in order to uncover the defective ply. Where the distortion occurs as a constant deviation of each of the cords of one ply from the intended cord angle, the conicity effect of the tire generally renders the tire unacceptable, or at least less serviceable since the "wiping wear" necessitates early replacement of the tire. Where the cord angle is distorted in a localized area, and especially if the distortion occurs in the shoulder area, the dynamic stability of the tire in this immediate area increases in non-uniformity in direct proportion to the amount of deviation from the designed angle. This distortion may occur in a manner wherein the cords are seemingly closer together for a limited distance in one of the shoulders of the tire, or the cords may undergo an irregular erratic angle change from the ideal, then again this distortion may be symmetrical in that it may occur in both shoulders of the tire, but with the distorted area not being located on oppositely adjacent sides of the cord and accordingly two different undesirable force variations are introduced into the tire. Such a tire not only wears excessively, but is also dangerous since it deteriorates rapidly and will eventually fail at high speeds.

Distortion of cord angles are more predominant in truck tires than passenger type tires. The more plies required in a tire, and the more tread rubber compound required by the tire, the greater is the problem of cord distortion. Cord distortion in belted radial tires normally is visually evident as an irregular cord spacing in the rubber insulation compound, particularly in the distance of the cords of a plane from the interior tire surface. Non-uniformity of radial tires is particularly undesirable because of difference in tension which exists between individual tire cords although the tension may be relatively uniform along any single cord path.

SUMMARY OF THE INVENTION

A green tire, that is, a fabricated tire that has not been vulcanized, is first expanded or shaped in the conventional manner, then preheated to an elevated temperature while simultaneously subjecting the cords to an increase in tension. The amount of preheat received by the tire is controlled in a manner to avoid imparting the tire with sufficient heat energy to permit the vulcanization reaction to proceed to a value wherein appreciable vulcanization of the rubber compounds can occur, so far as regards the final properties of the tire after the tire has been completely vulcanized. This amount of preheat is preferably the maximum amount that can be obtained with the foregoing accomplishment in mind. The inflated preheated green tire is first deflated, then placed in a tire mold and again expanded into its final configuration using a pressure which imparts the equivalent effect as the air pressure of the air chamber upon the finished tire, and which imparts a tension to the individual cord which is in the range of 2% to 10% of the cords breaking strength. As the thickness and stiffness of the shaping bag increases the internal bag pressure has to be correspondingly increased so as to achieve the desired final tension in the individual tire cords.

It is therefore a primary object of this invention to provide a method of improving the durability of a tire that includes molding the tire wherein a minimum amount of distortion of the individual plies of the tire is accomplished.

Another object of this invention is to provide a method of tire building wherein the non-uniformity of the tire is reduced to a minimum.

Another object of this invention is the provision of a tire having an exceptional resistance to wear and having improved durability.

A further object of this invention is the provision of a method of controlling the manufacture of tires to thereby reduce the force variations existent within the tire to a minimum.

Still another object of this invention is to provide a method wherein tire manufacture is modified in a manner to provide minimum distortion of the cords of the various plies with respect to the remaining elements of the tire.

Another object of this invention involves the provision of heat energy and inflation pressure to the tire prior to the vulcanization reaction to thereby modify the tire manufacture in a manner that avoids misalignment of various cords in a ply with respect to the remaining tire structure.

A still further object of the invention is to permit all tire body cords to have essentially the same tension when subjected to ordinary inflation pressures in usage and further to have a uniform change in tension along the cord path with such absolute tension being primarily governed by the degree of lofting.

These and various other objects and advantages of this invention will become readily apparent to those skilled in the art upon reading the following detailed description and by referring to the accompanying drawings.

The above objects are attained in accordance with the present invention by providing the preshaped fabricated green tire with preheat under internal pressure, whereupon the preheated tire is placed in a mold and forced into a configuration approximating the final configuration of the tire.

DESCRIPTION OF THE PREFERRED EMBODIMENTS

Figure 1:
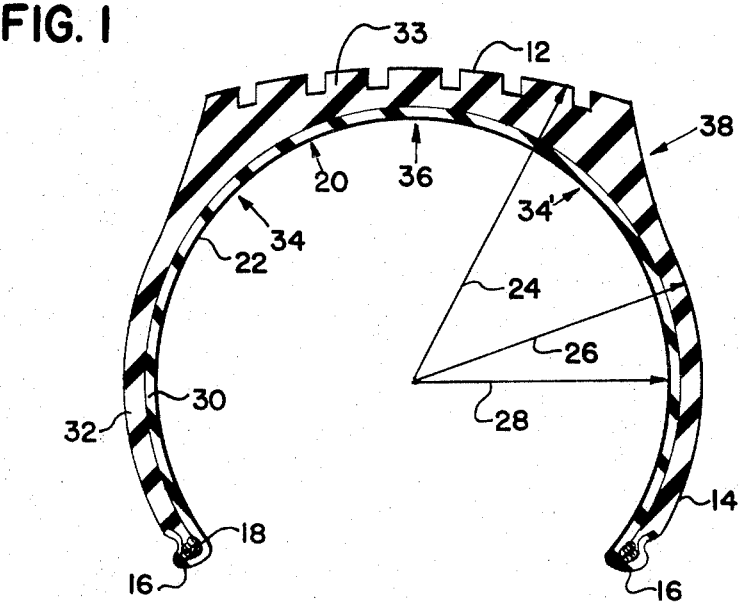
FIG. 1 is a cross-sectional representation of a vulcanized conventional pneumatic tire showing the various elements of the tire associated therewith.

Looking now to the details of FIG. 1 in conjunction with the remaining figures wherein there is seen broadly illustrated by the arrow at numeral 10 a conventional pneumatic tire having a tread wearing portion 12, a side wall 14, and a bead 16 enclosing bead wires 18 therein. The inside peripheral wall 20 forms the pneumatic air chamber and includes a liner compound at 22 when desired.

Numeral 24 indicates the radius described by the outer extremity of the tread compound, numeral 26 indicates the radius described by the outer side wall, and numeral 28 indicates the radius described by the inside peripheral wall of the material forming the air chamber. The plies of the tire 30 support the sidewall rubber compound 32. The lower buttress area of one side is generally indicated by the arrow at numeral 34 and 34' and the crown area of the tire by the arrow at numeral 36. The upper buttress area that diverges into the ground contacting portion of the tread is seen at numeral 38.

Figure 2:
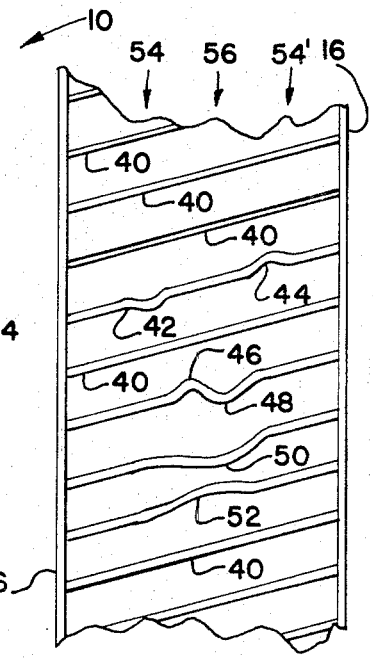
FIGS. 2 and 3 each are a diagrammatical representation of a portion of the inside surface of a conventional pneumatic tire with the tire laid out flat and showing the cords in both a normal and a distorted condition.
Figure 3:
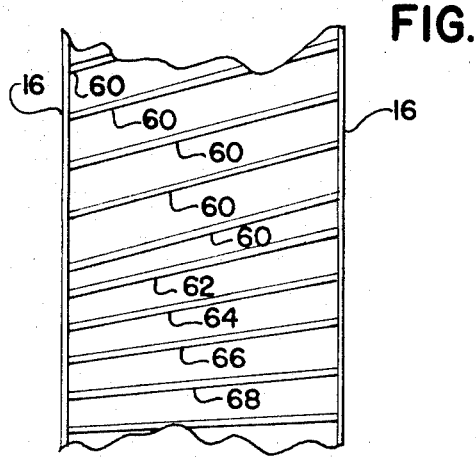

Looking now to the details of FIGS. 2 and 3, there is disclosed therein a schematical representation of the cord arrangement of a conventional tire, such as seen in the illustration of FIG. 1 and wherein the tire is laid out flat with the bead 16 being longitudinally disposed at each outer marginal edge portion thereof, in order to simplify explanation of the invention. It is specifically pointed out that the presentation is schmatic and symbolic only, and that the actual cord path with its idealized angular displacement from imaginary lines extending circumferentially around the tire are related to the original bias angle cut, the diameter (or varying diameters) of the building drum and the final diameter(s) of the imaginary circumferential lines obtained as a consequence of the forming or lofting operation, followed by subsequent vulcanization. Thus the cord angle of each individual cord with these imaginary circumferential lines is constantly changing as the cord makes its way from one bead to the opposite bead. Diagrammatically illustrated at numeral 40 are a number of ply cords that are properly arranged with respect to the remaining elements of the tire. Numeral 42 illustrates a defect in the cord structure, while numeral 44 illustrates a defect in the cord structure in opposite direction to defect 42. Numerals 46 and 48 illustrate a serpentine-like defect that may occur anywhere along the cord path. Numerals 50 and 52 illustrate other defects occurring within the cords of the tire and which also may occur anywhere along the cord path. Numeral 54 illustrates the buttress area of the tire and corresponds to numeral 34 of FIG. 1, while numeral 54' illustrates the other buttress area of the tire and corresponds to the numeral 34' of FIG. 1. Numeral 56 generally illustrates the crown area of the tire and generally corresponds to numeral 36 of FIG. 1.

FIG. 3 illustrates both normal and abnormal cords of a ply wherein numeral 60 illustrates ply cords disposed in a normal manner, while the cords 62 through 68 illustrate distorted cords since they are compressed together on the left side of the drawing.

Figure 4:
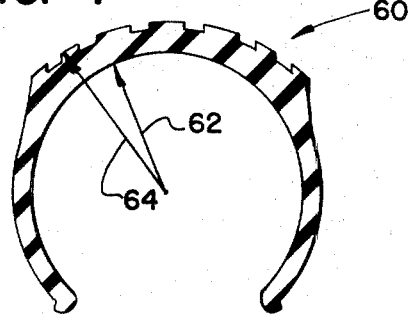
FIG. 4 is a diagrammatical cross-sectional representation taken along the upper portion of a conventional pneumatic tire.
Figure 5:
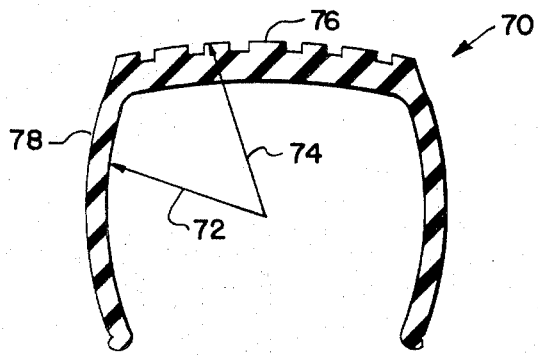
FIG. 5 is a diagrammatical cross-sectional representation of the lower portion of a conventional pneumatic tire, with the tire being distorted since it is contacting the ground.

Looking now to the details of FIGS. 4 and 5, wherein there is illustrated an inflated tire 60 having an inside peripheral surface that describes a radius 62, and a sidewall that describes a radius 64, and accordingly it may be seen that the tire is not carrying a load. The arrow at 70 illustrates a tire of different design when compared to the tire seen in FIG. 4, and wherein the illustrated tire section is carrying a load. The arrow at 72 generally illustrates the curvature of the inside peripheral wall surface formed by the air chamber, while 74 illustrates the curvature of the ground contacting tread portions 76. Numeral 78 is the sidewall of the tire.

Figure 6:
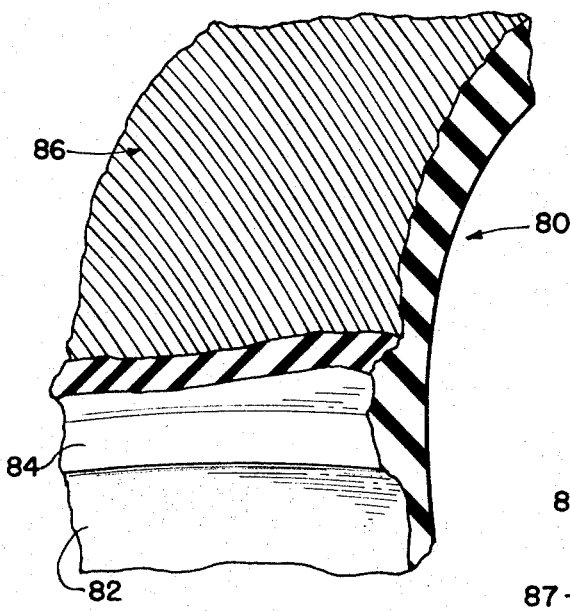
FIG. 6 is a fragmentary partial cross-sectional view of a pneumatic tire showing normal cord distribution.

FIG. 6 shows a satisfactory tire 80 having a side wall 82, a scuffing rib 84, and a multiplicity of cords 86 arranged in substantially parallel relationship with respect to each other. The cords 86 follow the intended design pattern desired by the tire maker, and represents a uniform cord arrangement. The tire 80 corresponds to the tire design of FIG. 4.

Figure 7:
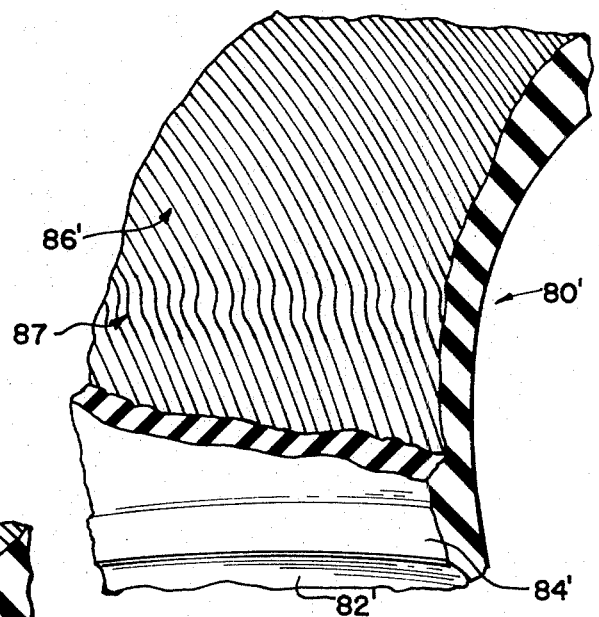
FIG. 7 is a fragmentary partial cross-sectional view of a pneumatic tire showing irregular or non-uniform cord distribution.

FIG. 7 shows a defective tire 80' having a side wall 82', a scuffing rib 84', adn a multiplicity of cords 86'. The cords 86' are seen to exhibit a large degree of non-uniformity with the area indicated by the arrow at numeral 87 showing the greatest amount of variation from the idealized cord paths. Except for the defective cord at 87, tire 80' is identical to tire 80.

Figure 8:
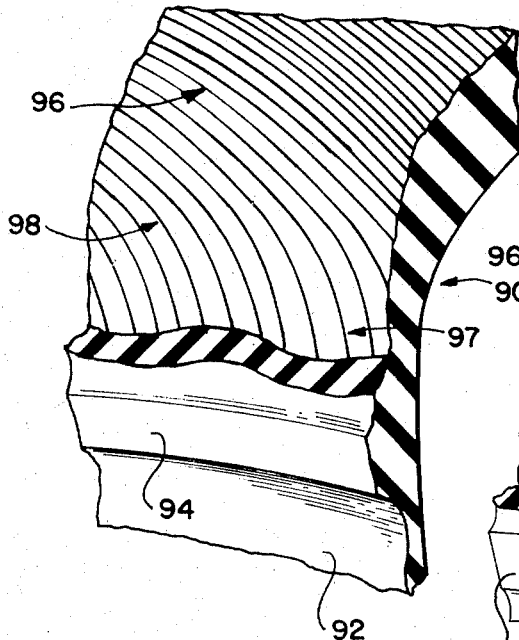
FIG. 8 is another fragmentary partial cross-sectional view of a pneumatic tire showing a normal cord distribution.

FIG. 8 illustrates a satisfactory tire 90 having a side wall 92, a scuffing rib 94, and a multiplicity of cords 96. The arrow at numeral 98 indicates the area where the cord angle undergoes an abrupt angle change, and corresponds to the tire design of FIG. 5.

Figure 9:
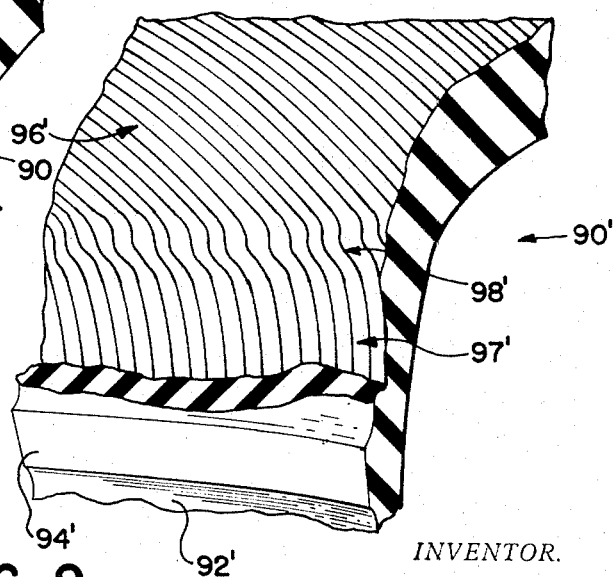
FIG. 9 is a fragmentary partial cross-sectional view of a pneumatic tire showing another form of irregular or non-uniform cord distribution.

FIG. 9 shows a tire 90' having a side wall 92', a scuffing rib 94', and a multiplicity of cords 96'. The arrow at numeral 96' and 97' indicates uniform cord patterns, while the arrow at numeral 98' indicates cords having a high degree of non-uniformity. It is noted that the non-uniform cord distribution, or distorted cords, also lie in the area where the cord angle undergoes an abrupt angle change. Except for the distorted cords, FIGS. 8 and 9 are identical tires.

OPERATION OF THE INVENTION

Biased constructed and belted bias tires, such as seen in FIG. 1, are generally assembled by a tire building technician on what is sometimes called a drum. The various elements of the tire are built element upon element with the various components of the tire being assembled so that when the unvulcanized tread is added to the remaining elements, the entire assembled tire resembles an open ended drum. In the building operation, as a tire increases in bulk due to the addition of the ply structure and other components, the general appearance of the tire begins to resemble a wooden barrel type configuration. The green tire is then placed into a tire mold, a curing bag or tube placed or expanded within the open ended drum, whereupon the green tire is then forced by means of pneumatic, steam, or water pressure into the configuration of the curing mold. The heated mold then vulcanizes the tire. As the tire is expanded from the configuration of the drum into the final configuration of the mold, the biased construction of the plies allow the cord angle to be changed from the angle as cut on the bias cutter to some other angle that is imposed by the expansion forming operation, inasmuch as considerable expansion occurs as the tire is deformed from the size of the drum to the size of the vulcanization mold. The massive tread rubber along with the sidewall rubber must be distorted along with the fabric or cords of the plies into the desired shape of the final product, which is a pneumatic tire. The tread rubber particularly resists the forces which change the green tire from the first diameter of the drum to the second diameter of the tire mold. The fabric that makes up the individual plies also resist change from the first to the second diameter.

The reason that a tire exhibits resistance to change from the configuration of the drum to the final configuration of the tire is a two-fold problem related to both the elasticity and viscosity of the rubber compound. The elasticity of rubber is present in the raw rubber compounds prior to vulcanization; thus, a raw unvulcanized rubber ball will bounce the same as a vulcanized rubber ball. Vulcanization obviously improves the bounce by virtue of eliminating the plastic flow component of the raw rubber. Nevertheless, the nerve of the rubber or the memory of the rubber to revert to its former state after being subjected to a deformation force will still exist in the raw (green) unvulcanized tire. Accordingly, after molding the tire of its approximate final shape from its original barrel-like shape (open on both ends), if the shaping bladder or tube were removed, the rubber would tend to pull back to partially regain its original flat barrel-like structure. The memory or nerve of the rubber decreases with an increase in temperature; and, of course, the viscosity or plastic flow component also increases with an increase in temperature. Therefore, in addition to the normal irregularities in the cord path that are permanently vulcanized into the final tire, there is also a certain amount of stress built into the tire. The ability of each individual cord to conform to the new shape depends upon the controlling forces that the plies are subjected to which includes the elastic nature of the rubber, viscosity, and slippage of one cord material with respect to an adjacent cord material, as well as to the adjacent rubber compound. Sometime the various forces applied to the inside of the tire will force the tire elements into a distorted rather than aligned condition because of an imbalance of forces existent within the elements of the tire. These distortions occur primarily in the shoulder buttress area 34, 34', but may also occur anywhere along the cord path. The distortion may be evidenced as a curved group of cords as seen at 42, 44, 87, and 98' wherein the individual cords form a wavy pattern over several inches of the ply. The distortion can also occur in the crown area 36 as evidenced by a serpentine pattern 46 and 48, or a bow 50. Where one ply has been improperly assembled with respect to the remaining tire elements, the adjacent cords may distort into a pattern as seen at 62 through 68 in FIG. 3.

The cord angle change from the bias cut angle is small in the area adjacent bead 16 with the angle change enlarging as the distance from the bead increases. The angle change in the sidewall is fairly uniform up to the tire shoulder, where the angle change increases. This is especially so where the tire is not a perfect circle as seen in FIGS. 4, 6, and 7 but rather is made to resemble a square shape as seen in the exaggerated illustration of FIGS. 5, 8, and 9, wherein the shoulder 78 is fairly flat and the road contacting surface 76 is fairly flat, but the area therebetween undergoes a rapid change in radius of curvature. This rapid change is also near the shoulder buttress area 34, 34' where maximum flexing of the tire occurs. For this reason, distorted or non-uniform cord angles in the buttress area impart severe radial and lateral force variations to the tire.

As stated above, the inability of the cord material of the various plies to be uniformly distorted into the necessary configuration of the final tire is primarily due to the restraining influence of the tread rubber compound since the cords of the various plies as well as the adjacent plies must undergo a certain amount of slippage with respect to one another. Accordingly, the opposing forces tending to prevent the necessary distortion of the cords and rubber compound during the expansion of the green tire bring about an unbalanced distorted cord planograph. The forces resisting the change in the geometrical configuration of the cords can be reduced by lowering the viscosity of the rubber compound adjacent the individual cords undergoing deformation. Preheating a tire lowers the viscosity of the rubber compound and while the viscosity is lowered, the individual tire cords can more easily be relaxed to a uniform tension along their entire length when subjected to a tension force. At elevated temperatures a tire may more easily be molded into its final shape.

Furthermore, preheating the green tire after it is shaped, and while simultaneousy subjected to a force which places the individual tire cords in tension, enables the elastomeric elements of the tire to become more plastic in nature, and accordingly the distortion of the tire from the configuration on the tire building drum to the final configuration where it is expanded into the mold occurs with considerably reduced cord irregularities than occurs with a tire that undergoes this deformation at room temperature without a sufficient relaxation period before incipient vulcanization. Examination of tires having poor durable characteristics often disclosed that the cord angle within the tire had deviated markedly from its idealized path. The individual cords that run from one bead to another, sometime undergo a zigzag or serpentine path, especially in the tire shoulder area, and sometime in the crown. This variation from the normal idealized path is due to the inability of the individual cords to respond completely to the applied forces of shaping and accordingly irregularities occur. The restraining influence causing the above irregularities of cords is the basic restraining viscosity of the rubber compound in the cold green tire. Preheat lowers this viscosity which in turn allows the individual tire cords to assume a uniform tension along their length after the forming operation but before the curing operation to thereby provide a more uniform tire. It has especially been noted that preformed preheated tires under an internal pressure have less irregularities with respect to the tire cords in the area 34 where maximum flexing occurs. Since this area is the point in the tire where maximum flexing occurs, and is also the point where maximum cord distortion and irregularities is evident, as well as being the primary area that controls the dynamic flexibilities of the tire, improvement of the tire elements in this region brings about a decided improvement in tire durability.

In vulcanizing large truck tires the curing bag or tube must exert about 300 p.s.i., while a conventional automotive tire requires only about 200 p.s.i. The temperature of vulcanization in either operation is of the magnitude of 360° F. Accordingly, hot (superheated) water at 360° F. must be used to obtain the necessary lofting or forming forces for the truck tire, while steam is used in the lofting of the less bulky passenger tire. The use of hot water requires cumbersome recirculation means in order to maintain the desired internal tire temperature.

Lowering the viscosity of a rubber compound by means of preheating while simultaneously subjecting the tire cords to tension therefore enables a bias constructed tire to be changed from the configuration of the tire building drum to the configuration of the vulcanizing mold with a minimum of distortion of the individual cords from their individual idealized paths. It is desirable, in order to properly coordinate the tire building process with the vulcanization process, to provide the vulcanization process with prefabricated, green tires that exhibit maximum uniformity of construction when placed into the mold. This expedient can be accomplished by first forming or shaping the tire at some ambient temperature, then preheating the tire to the maximum permissible temperature that may be attained without suffering appreciable vulcanization within the rubber compound of the tire while simultaneously applying tension to the tire cords.

Tension in the individual tire cords may be maintained constant or may be alternately increased then decreased in a cyclic or pulse-like fashion. If cord relaxation proceeds too slowly for a normal curing cycle, it may be necessary to resort to relatively high pressures that may necessitate a smooth walled mold of the same contour and shape as the final curing mold to help support the tire body so that it will not blow out during the cord relaxation step.

Various rubber compounds have different maximum temperatures to which they can be preheated without the rubber compound undergoing significant vulcanization so far as regards the subsequent vulcanization reaction. Therefore it is necessary to ascertain this maximum temperature to which the green tire can be subjected in order to eliminate the occurrence of excessive vulcanization during the prefabrication operation.

The warming or heating operation while the tire is under controlled inflation is best accomplished without any restrictions being applied to the tire exterior. The length of the heating cycle during the tensioning step is preferably equivalent to one tire curing cycle. Accordingly, a green cold tire is first shaped in a conventional manner, then preheated with hot water or steam at a pressure which places each individual tire cord under tension. The tire is left in this condition until a previously treated tire is removed from the curing mold, thereby enabling the last treated tire to be received by the mold when it is cured so as to carry out a continuous process. If cord relaxtion is not complete within the required time when using the above procedure, a greater internal hot water or steam presure may be employed on a cyclic basis, i.e.—a high pressure may be employed for a short time duration then reduced to a lower level, followed by a high pressure application with a subsequent low pressure application. The time interval of high pressure application must be adjusted to the specific tire being treated, with the time being varied for a two ply passenger tire as compared to a ten ply truck tire, for example.

A gradual pressure pulse force diminishing in magnitude with time lapse has also been found to work satisfactorily. While internal heating will satisfactorily accomplish proper and uniform cord relaxation, those skilled in the art will realize that other means for heating, such as dielectric heating, could also be used to accomplish the same cord relaxation while remaining within the scope of this invention. Where deemed desirable, the tire need not be cured immediately after the cord relaxation step, but instead may be stored until it is convenient to carry out the final vulcanization step.

The green preformed tire carcass has the cords thereof aligned in a superior manner because the preheat process lowers the viscosity of the rubber to thereby enable the tire cord elements to readily conform to the configuration of the mold while maintaining their individual idealized cord paths with a minimum of non-uniformity of tension. The cords of the preheated tire are more parallel with respect to each other and more closely follow the preferred design since they are more uniformly relaxed to the forces of tension. Cord angle change in the shoulder will be a constant, rather than exhibiting the various undesirable non-uniform patterns illustrated above.

In some rubber compounds it has been found that a temperature of 145° F. is suitable in order to lower the viscosity of the rubber a sufficient amount to enable the prefabrication to be carried out. Furthermore, because of excessive accelerators in the rubber compound, it is sometimes necessary to maintain the preheated temperature at this minimum amount. Where the curative dosages of the rubber compound are a minimum, it is possible to preheat the tire for a limited time to a temperature of 230° F. without significant vulcanization reaction occurring within the green tire. Preheat may be attained by utilizing any known means of heat transfer, including circulation of hot water or steam through the curing or shaping bag, storage of the green tire in a heated enclosure, use of radiant energy, or dielectric heating means. The last expedient is especially useful where temperatures become critical due to high preheat temperature levels and/or excessive accelerators contained in the rubber compound.

Since the wear rate of a tire, as well as tire durability is directly proportional to the amount of tire non-uniformity exhibited by a pneumatic tire, the present method enables the fabrication of a tire having a minimum amount of non-uniformity associated therewith. Therefore the present method provides a pneumatic bias constructed tire, a bias belted tire, or a radial belted tire having maximum durable properties and minimum rate of wear.

I claim:

1. A method of manufacturing a pneumatic tire having at least one ply fabricated from a tire cord material including tire cord insulation compound and a tread wearing compound circumferentially arranged about the outer peripheral surface thereof, comprising the steps of:
   (1) building said tire upon a suitable form to provide an unvulcanized tire assembly;
   (2) preheating said unvulcanized tire assembly to a temperature below the normal vulcanization temperature of said tread wearing compound and tire cord insulation compound, until said unvulcanized tire assembly has substantially reached an equilibrium temperature;
   (3) expanding said tire assembly in a manner to force the tire assembly into a configuration that is substantially equal to the final dimensions of the finished tire;
   (4) subjecting the tire cords to a force which is 2% to 10% of the breaking strength of the cord;
   (5) heating the tire in a tire mold for a sufficient time and temperature to effect vulcanization thereof.

2. The method of claim 1 wherein the expansion process of step (3) is carried out by placing a heated bag within the tire.

3. The method of claim 1 wherein the preheating of step (2) is carried out by dielectric heating means.

4. The method of claim 1 and further including the step of:
   (6) storing the unvulcanized tire after step (4) and prior to the vulcanizing of step (5).

5. The method of claim 1, wherein step (3) is carried out by reducing the normal pressure required by the curing bag in accordance with the lowered power requirements provided by the preheating of step (2).

6. The method of claim 1 wherein step (3) is carried out to thereby provide preformed uncured tires having a minimum of irregularities of the individual cords from their idealized paths from bead to bead, and further including:
   (6) placing said uncured tire in a tire mold and subjecting the tire to a sufficient temperature and pressure for an interval of time to cause each cord of the time to assume a constant tension and improved cord path.

7. The method of claim 1 wherein the expanding step (3) is carried out by placing a curing bag in the tire and cyclicly subjecting the bag to an internal pressure.

8. A method of achieving a more uniform tire having a minimum of force variations therein, by the following steps:
   (1) assembling the elements of the tire by placing a tread wearing compound about the outside of a ply cord material in a manner to provide an uncured tire;
   (2) preheating the uncured tire until the elements thereof are between the limits of 145° F. to 235° F. while subjecting the cords thereof to a tension force which is less than 10% of the breaking strength of the cord, while simultaneously expanding the uncured tire into a configuration which more nearly resembles the final configuration of the vulcanized tire;
   (3) vulcanizing the tire in a curing mold to thereby complete the manufacture thereof.

9. The method of claim 8 wherein the preheating step and the expanding step is carried out by circulating a heating medium through a bag which provides the force for the cord tension.

10. The method of claim 8 wherein the expanding step is carried out by cyclicly subjecting the tire to an internal pressure.

11. In a pneumatic tire having a ply fabricated from tire cord material including tire cord insulation compound and a tread wearing compound circumferentially arranged about the outer peripheral surface thereof, with the ply extending between spaced apart beads, the method of improving the uniformity of the tire comprising the steps of:
   (1) building said tire upon a suitable form to provide an unvulcanized tire assembly;
   (2) preheating said unvulcanized tire to a temperature below the normal vulcanization temperature of said tread wearing compound and tire cord insulation compound, until said unvulcanized tire has reached an elevated temperature which is above the temperature of step (1), while at the same time expanding said tire in a manner to force the tire into a configuration that is substantially equal to the final dimensions of a finished tire with the expansion step being of a sufficient magnitude to place the individual cords thereof in tension and wherein the expanding step is carried out by placing a curing bag in the tire and cyclicly subjecting the tire to an internal pressure;
(3) maintaining the preformed substantially unvulcanized tire at said elevated temperature until the tire is transferred into a tire mold; and
(4) vulcanizing the tire of step (3) in said tire mold to thereby provide a pneumatic tire having improved uniformity.

References Cited
UNITED STATES PATENTS

| | | | |
|---|---|---|---|
| 1,161,966 | 11/1915 | Price | 156—123 |
| 1,428,419 | 9/1922 | De Mattia | 156—123 X |
| 1,580,625 | 4/1926 | Palmer | 156—133 |

STEPHEN C. BENTLEY, Primary Examiner